United States Patent
Annan et al.

(10) Patent No.: US 9,724,824 B1
(45) Date of Patent: Aug. 8, 2017

(54) SENSOR USE AND ANALYSIS FOR DYNAMIC UPDATE OF INTERACTION IN A SOCIAL ROBOT

(71) Applicant: Sprint Communications Company L.P., Overland Park, KS (US)

(72) Inventors: Brandon Annan, Westwood Hills, KS (US); Joshua R. Cole, Overland Park, KS (US); Deborah M. Gilbert, Overland Park, KS (US); Dhananjay Indurkar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 116 days.

(21) Appl. No.: 14/794,765

(22) Filed: Jul. 8, 2015

(51) Int. Cl.
| | |
|---|---|
| *B25J 11/00* | (2006.01) |
| *B25J 9/00* | (2006.01) |
| *B25J 9/16* | (2006.01) |
| *G06N 7/00* | (2006.01) |
| *G06F 3/16* | (2006.01) |

(52) U.S. Cl.
CPC ............... *B25J 9/16* (2013.01); *G06F 3/165* (2013.01); *G06N 7/005* (2013.01)

(58) Field of Classification Search
CPC . B25J 9/0003; B25J 9/16; B25J 9/1628; B25J 9/163; B25J 11/0005; B25J 11/001; B25J 11/0015; B25J 11/003; G06F 3/165; G06N 7/005
See application file for complete search history.

(56) References Cited

U.S. PATENT DOCUMENTS

| | | | |
|---|---|---|---|
| 8,463,720 B1 | 6/2013 | Seale et al. | |
| 8,948,935 B1 | 2/2015 | Peeters et al. | |
| 9,051,043 B1 | 6/2015 | Peeters et al. | |
| 9,087,451 B1 | 7/2015 | Jarrell | |
| 9,158,304 B2 | 10/2015 | Fleck | |
| 9,213,931 B1 | 12/2015 | Annan et al. | |
| 9,375,845 B1 | 6/2016 | Annan et al. | |
| 9,529,359 B1 | 12/2016 | Annan et al. | |
| 2007/0156625 A1 | 7/2007 | Visel | |

(Continued)

OTHER PUBLICATIONS

Notice of Allowance dated Aug. 12, 2016, U.S. Appl. No. 14/592,677, filed Jan. 8, 2015.
Restriction Requirement dated Dec. 7, 2015, U.S. Appl. No. 14/503,385, filed Sep. 30, 2014.
Notice of Allowance dated Jul. 30, 2015, U.S. Appl. No. 14/607,792, filed Jan. 28, 2015.

(Continued)

*Primary Examiner* — Nicholas Kiswanto
*Assistant Examiner* — Adam Mott (57) ABSTRACT

A method of optimizing social interaction between a robot and a human. The method comprises generating then executing a robot motion script for interaction with a human by a robot based on a characteristic detected by at least one of a plurality of sensors on the robot. The method further comprises detection, by at least one sensor of the robot, a reaction of the human during a first period. The robot then analyzes the reaction of the human and assigns a positive or negative classification to the reaction based on pre-defined mapping stored in the memory of the robot. The method further comprises modifying the robot motion script to incorporate a pre-defined modification based on the determination of a negative classification of the human reaction. The method further comprises executing the modified robot motion script during a second period to obtain an improved interaction with the human.

20 Claims, 6 Drawing Sheets

(56) References Cited

U.S. PATENT DOCUMENTS

| | | |
|---|---|---|
| 2007/0183604 A1* | 8/2007 | Araki .................... G10L 17/26 |
| | | 381/58 |
| 2007/0282765 A1 | 12/2007 | Visel et al. |
| 2011/0158470 A1 | 6/2011 | Martin et al. |
| 2012/0280087 A1 | 11/2012 | Coffman et al. |
| 2013/0015236 A1 | 1/2013 | Porter et al. |
| 2013/0126619 A1 | 5/2013 | Del Fiume et al. |
| 2014/0277735 A1* | 9/2014 | Breazeal .............. B25J 11/0005 |
| | | 700/259 |
| 2015/0341540 A1 | 11/2015 | Kim et al. |
| 2015/0365159 A1 | 12/2015 | Bosworth |
| 2016/0063987 A1 | 3/2016 | Xu et al. |
| 2016/0093212 A1 | 3/2016 | Barfield, Jr. et al. |
| 2016/0116912 A1 | 4/2016 | Nehmadi et al. |

OTHER PUBLICATIONS

Annan, Brandon C., et al., Patent Application entitled, "Synchronizing Robot Motion with Social Interaction," filed Sep. 30, 2014.

Annan, Brandon C., et al., Patent Application entitled, "Interactive Behavior Engagement and Management in Subordinate Airborne Robots ," filed Jan. 8, 2015, U.S. Appl. No. 14/592,677.

Notice of Allowance dated Feb. 16, 2016, U.S. Appl. No. 14/503,385, filed Sep. 30, 2014.

Annan, Brandon C., et al., Patent Application entitled, "Dynamic Interactive Robot Dialogue Creation Incorporating Disparate Information Sources and Collective Feedback Analysis," filed Mar. 3, 2016, U.S. Appl. No. 15/060,565.

Annan, Brandon C., et al., Patent Application entitled, "Interactive Behavior Engagement and Management in Subordinate Airborne Robots ," filed Nov. 8, 2016, U.S. Appl. No. 15/346,697.

* cited by examiner

SENSOR USE AND ANALYSIS FOR DYNAMIC UPDATE OF INTERACTION IN A SOCIAL ROBOT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Robots are electromechanical devices that are controlled by logic executed by the robot and may be autonomous or semi-autonomous. For example, computer programs stored in electronic memory in the robot may be executed by an electronic processor in the robot to analyze inputs from electronic sensors in the robot and to send commands to various output devices in the robot such as electromechanical actuators, speakers, and other devices. Recently, robots have come to have widespread use in industry, for example in manufacturing automobiles.

SUMMARY

In an embodiment, a social robot is disclosed. The social robot comprises a speaker, a plurality of sensors, a processor, and a non-transitory computer readable medium storing programming for execution by the processor, the programming including instructions to: identify a characteristic of a human via at least one of the sensors; generate, based on the characteristic, a robot dialog for interaction with the human and playback the dialog as audible speech via the speaker to initiate a social interaction between the social robot and the human.

In an embodiment, a method for adapting robot motion to improve social interaction between a robot and a human is disclosed. The method comprises the identification of a characteristic of the human via a sensor of a social robot, generating, based on the characteristic a robot motion script for interaction with the human and executing, by the social robot, the robot motion script to initiate a social interaction between the social robot and the human.

In an embodiment, a method for adapting robot motion to improve social interaction between a robot and a human is disclosed. The method comprises generating, by the social robot, a robot motion script for interaction with a human, executing, by the social robot, the robot motion script to interact with a human during a first period, detecting, by the social robot, a reaction of the human during the first period via a sensor, analyzing the reaction of the human, modifying the robot motion script based on the analysis to obtain a modified robot motion script, and executing, by the social robot, the modified robot motion script during a second period to obtain an improved interaction with the human.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Social robots may communicate with people in a social manner, wherein the social robot may reply to questions and statements from users. The social robot may identify particular users and keep a record of them so that it may address those users by their names. Unlike robots on assembly lines, the goal or purpose of social robots may be to interact with people socially: to have conversations with people, to provide companionship to people, to motivate and encourage people, to provide assistance to people, to commiserate with people in times of loss or other difficulty, and the like. Social robots may engage in teaching people, coaching people, or entertaining people. Social robots may engage in encouraging elderly persons to perform exercises to maintain mobility, flexibility, and general health. Social robots may be used to augment teaching and may have particular efficacy in working with autistic children as well as in providing companionship to elderly persons who live alone.

The present disclosure teaches modifying motion and dialog scripts during interactions between a social robot and a human being through the use and analysis of sensor data, obtained by the social robot, to shift or optimize dialog interaction.

By enabling a social robot to take in, process, and acknowledge visual or audio cues given by a human the quality of the interaction can be taken to a more desirable level. The present disclosure allows the robot to weigh personal expressions and preferences of a human: i.e., their clothing and hairstyle against their biometric data and adjust profiles to accommodate conversational topics and actions based on a personalized profile and then analyze feedback from the human it is interacting with to update dialog scripts allowing for a continuously improved quality of interaction. The adjustments made can be logged into profiles and accessed in the future by the social robot to provide more meaningful interactions from the perspective of the human and reported back to a manufacturer or database for the use and benefit of other robots. The robot can also access profiles, scripts, or script-mapping data by retrieving data from a database, e.g. a remote database maintained by an operator or manufacturer.

It should be understood at the outset that while the present disclosure describes the interacting parties as a social robot and a human, the human may also be referred to as a human conversant, human interlocutor, human being or other terms as they are known in the art.

Figure 1:
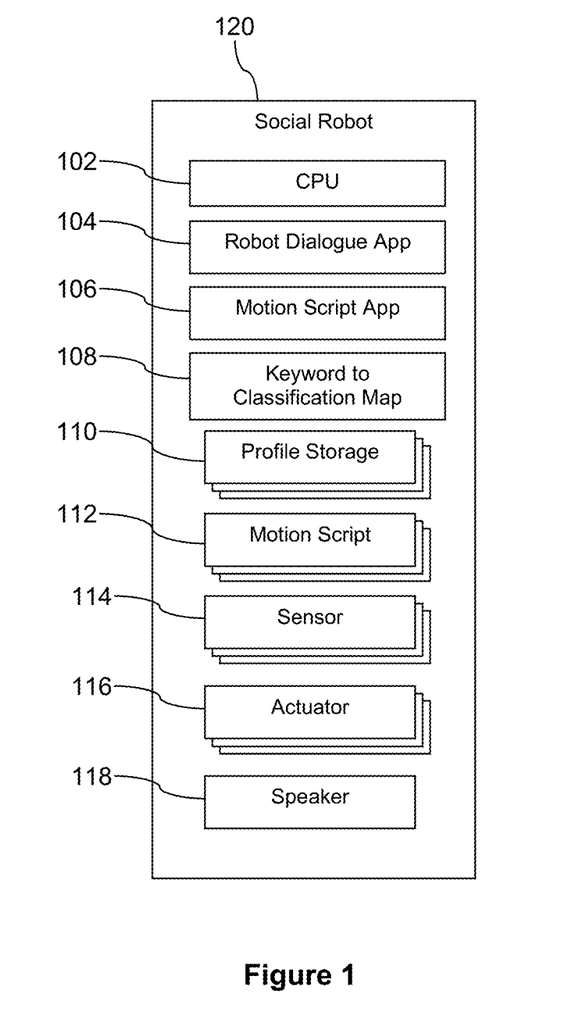
FIG. 1 is a block diagram of a robot motion script system according to an embodiment of the disclosure.

Turning to FIG. 1, a social robot 120 is described. In an embodiment, the social robot 120 comprises a processor 102, a robot dialog application 104 to execute dialog from scripts stored in the robot 120 for playback through one or more speakers 118, a motion script app 106 to execute motion scripts 112 stored in the robot 120 through one of a plurality of actuators 116, a profile storage 110 to house accumulated one or more profiles for interactions with specific individuals, and a plurality of sensors 114 to collect audio and visual feedback. Using data pulled from the sensors 114, the keyword to classification map 108 analyzes feedback and uses positive or negatively mapped classifications to instruct the motion script app 106 to create new motions and/or to instruct the robot dialog app 104 to create new dialog to be executed through actuators 116 and speaker 118.

One purpose of a social robot 120 is to interact with at least one human being. Currently, teaching applications for various computer systems may be based on a user manually inputting data to set up profiles, habits, and desired outcomes. This process is time consuming and can be detrimental to the learning process. Having to constantly stop and update settings or user preferences is not only irritating but interrupts the illusion of a teacher or companion's presence and disrupts the learning environment which, in turn, impairs the learning experience.

In an embodiment, a social robot 120 according to the present disclosure can identify the user via sensors 114. A characteristic is detected that identifies the age, race, or gender of the human and allows the robot 120 to begin customizing the interaction with that human without requiring manual input. These characteristics may be audio or visual data. For example a characteristic such as the cadence or tone of the human's voice or the use of a vocabulary identifiable as belonging to a person of a certain age group may be used to determine the human's age. For example, a person who was a teenager in the 1960's might use the word 'groovy' as an adjective or might use known acoustic parameters of fundamental frequency and sound pressure level which correspond to age and gender as it is known in the art. The social robot 120 might identify the human as belonging to a specific age group based on this vocabulary, frequency, or sound pressure level, and use conversational prompts from profiles associated with this age group. Education level may also be estimated or deduced based on diction level—for example the complexity and/or variety of vocabulary used in spoken speech. Similarly, the sensors 114 might use visual data or clues to identify the user as a human.

For example, the robot 120 might identify wrinkles on an adult's face, a balding pattern of hair, or stooped posture which would be used to identify the human as belonging to a certain age group. The robot 120 might also detect the pigmentation of a user's skin to associate the human with a specific race. External, non-anthropometric identifiers chosen by the human might be identified by the sensors 114 and given a higher weight when determining the identity or gender of the user such as the user's style and type of clothing, body markings, piercings, makeup, and hairstyles. Data such as facial hair or the length of a human's hair might increase or decrease an estimation of the probability that a human is male or female. The social robot 120 may weigh characteristics identified by the sensors 114 and determine a statistical probability, expressed in a mathematical term, of the user's gender. Some factors might be given more statistical weight such as: body morphology, facial hair, clothing style, or hair style; while other factors might be given a lower statistical weight: such as a color of hair, voice cadence, vocabulary use, or facial bone structure. The absence of a particular user feature might be considered to be of minor importance to the probability of the user having a certain attribute, i.e., a user's posture. On the other hand, the presence of a particular user feature might be considered to be of much higher importance to the probability of the user having a certain attribute, i.e., facial hair or body morphology. The probability that the human has a particular characteristic (e.g., is male, is aged 40-45, or is talkative) may be calculated or estimated by the social robot using statistical methods. For example, the probability that the human has a certain characteristic or attribute may be calculated as:

$$P = [\Sigma a_i f_i]/\max$$

where $a_i$ values are i-number of different weighting coefficients associated with corresponding factors, $f_i$ values are i-number of different values of the factors associated with the subject characteristic, and max is the maximum sum that is possible for the specific characteristic. Thus P might have a value in the range from 0 to 1, or P may have some other range of values. It is understood that different human characteristics may have different numbers of factors and different weighting coefficient values.

In an embodiment, attribution of a gender characteristic to a human by the social robot 120 might occur if the calculated probability that the user is male is greater than 0.5 and the calculated probability that the human is female is calculated to be less than 0.5, the social robot 120 may deem or estimate the human to be male. Alternatively, if the calculated probability that the human is male is greater than the calculated probability that the human is female, the human may be deemed or estimated by the social robot 120 to be male and if the calculated probability that the human is male is less than the calculated probability that the human is female, the human may be deemed or estimated by the social robot 120 to be female. Alternatively, the probability equation to estimate the sex of the human may estimate the human is male if the probability is over 0.5 and may estimate the human is female if the probability is less than or equal to 0.5. It is understood that the polarity of this probability may be reversed, and a calculated probability value greater than 0.5 may estimate the human is female and a calculated probability value of less than or equal to 0.5 may estimate the human is male.

Similar probabilities may be calculated for other human characteristics. For example, human age may be partitioned into ten different age bins such as 0-10, 10-20, 20-30, . . . , and 90 and up. A probability that the age of the human corresponds to each of the age bins or categories may be determined, and the social robot 120 may deem or estimate the human has an age that falls in the age bin associated with the highest probability value.

In an embodiment, sensors 114 may identify characteristics of conflicting or overlapping characteristic groups. For example, sensors 114 may detect that a human is bald but speaks with a vocabulary indicative of a young age range and is using the voice cadence range of a female. Additionally, the sensors may detect that the human is wearing a skirt. In this instance the social robot 120 may weigh the deliberate association identifiers of the human higher than the biometric identifiers and apply a control question designed for the female gender to confirm the probability calculated by robot 120. Based on feedback from the control question the social robot 120 may then record this information in the profile storage 110 for future use and adjust its conversational log and prompts to match the updated profile.

In an embodiment, the social robot 120 may compile multiple characteristics and, based on the characteristics detected, begin a conversation-based interaction with an older, black male. In another embodiment the robot may begin, based on one or more of the characteristics detected, an education program for a child. The characteristic detected may be associated with a specific profile already in the robot's profile storage 110 or can alternately may be identified as unassociated with a profile, and a new profile can be created in the profile storage 110 based on the characteristic.

In another embodiment, the social robot may be used in a classroom environment to interact with more than one child. A profile located in the profile storage 110 may contain a previously identified characteristics of blonde hair, blue eyes, female, and Caucasian. The robot 120 may use sensors 114 to match multiple characteristics to identify an individual child and access the specific child's profile. The social robot may then execute a program or motion script 112 mapped to the identified profile. This allows the social robot 120 to be used by multiple users without interruption or overlap of previously associated dialog and motion scripts 112.

Figure 2:
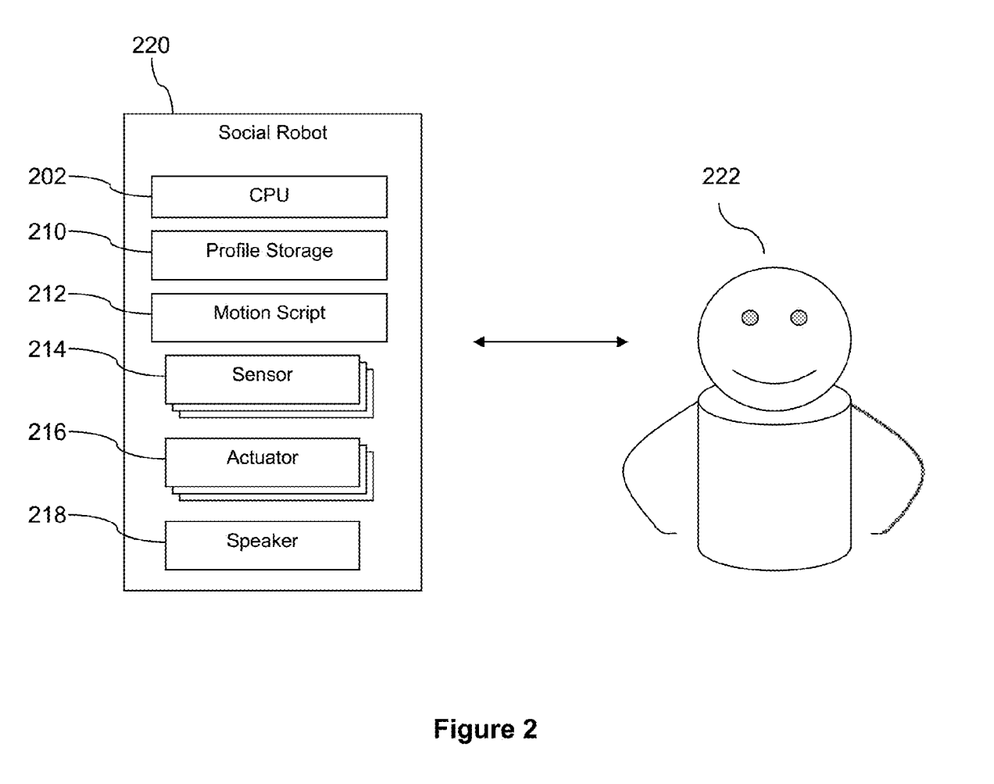
FIG. 2 is a block diagram of a robot according to an embodiment of the disclosure.

Turning to FIG. 2, a second social robot 220 is described. Some of the features of the second social robot 220 may be similar to those of the social robot 120. For example, the central processing unit (CPU) 202. Additionally, some of the use scenarios described above may be applicable to the second social robot 220. For example, the robot 220 may identify the human 222 based on a characteristic identified using data from sensors 214. This characteristic may be an indicator of age, race, or gender and may be collected via an audio sensor or a visual sensor. In an embodiment, the characteristic may be matched by the robot to a profile located in the profile storage 210 and, additionally, a conversation log may be accessed by the robot 220. The robot 220 may further engage the human 222 by executing a motion script 212, beginning at the last recorded interaction point rather than executing the motion script from the beginning. Throughout the interaction sensor data collected from the human 222 by sensors 214 may be analyzed and the motion script adapted when positive or negative reactions are detected. For example, if the human 222 becomes silent or crosses his arms when a deceased relative is brought up as a conversation topic, the robot 220 may detect the physical or vocal reaction and cease the current motion script 212. The robot 220 may note, in the profile storage 210, the conversation for this interaction and the resulting negative reaction and, based on the modified profile, avoid or skip future conversation topics along the same vein. A new motion script with a different topic may then be initiated and executed by the robot 220, and the process may be repeated as any new negative reactions are detected. In another embodiment, the human's reaction may take the form of a physical reaction such as a frown, raised eyebrows, a furrowing of the brow, narrowing of the eyes, slumping of the shoulders, tilting of the head or other negative mannerisms. In another embodiment, the human reaction detected by the sensors 214 may have an audio component such as crying, scoffing, or making a negative comment in response to the prompt. A lack of reaction by the human may also be detected. Indifference may be useful in determining the effectiveness of conversational topics and can be noted by the robot as a lack of any reaction by the human detected by the robot's sensors. The social robot 220 may then remove the topic from its current queue if it does not detect or observe any reactions using sensors 214 and assign a classification of non-engagement by the human to the topic.

In another embodiment, the robot 220 may detect, using the sensors 214, that the human 222 laughs at a sarcastic joke. The robot may then assign a positive classification to the reaction and modify the existing motion script 212 to include more sarcastic jokes. In this case, the user profile may be updated to reflect this preference so future interactions with the human 222 can include more sarcastic humor. It should be noted a positive reaction by the human may also be physical reaction in addition to a vocal reaction and can include smiling, laughing, an opening of body posture or sitting posture, nodding, crinkling of eyes, or a leaning back by the human.

In another embodiment, a characteristic may be determined by the robot to not match any existing profile in the profile storage 210. A new profile may then be created with the characteristic data acquired by the sensors, stored in the profile storage 210, and the robot 220 may then begin an initial interaction with the human 222 based on motion script 212 using the actuator 216 and/or speaker 218. Similar to above embodiments, reactions and preferences on content determined by the analysis of reactions detected by the sensors 214 will be used to modify the motion script 212 in order to improve the social interaction between the robot and the human.

In another embodiment, characteristic data may be acquired by the robot's sensors 214 which then map that characteristic to more than one profile. If the profile cannot be determined by an initial characteristic, the robot 220 may use the sensors 214 to acquire additional characteristic data until a single profile can be identified. For example, the existence of wrinkles and/or the facial geometry on the human 222 may indicate a certain age and the profile storage 210 may contain user profiles for both an elderly male and an elderly female. In an embodiment, the characteristic data may comprise an image of the human 222 and the existence of wrinkles and/or the facial geometry of the human 222 may be determined by the analysis of the image of the human 222 by the robot 220. The robot 220 may then acquire further characteristic data using the sensors 214 to determine which profile matches the human it is interacting with. These additional characteristics might include hair color, eye color, vocal characteristics, physical height or some other characteristics.

Trends in reactions or preferences can be logged and analyzed by the robot 220 to determine a predicted psychology of the human 222. This analysis may be useful for profiling purposes as successful subject matters which provoke positively classified reactions may be grouped together or suggested as modifications for similar profiles. This analysis may also be useful because as the robot 220 accumulates interaction data it may be able to build more detailed and complete psychological profile to be used in future interactions with the human.

In another embodiment, the social robot 220 may be used as a teaching aide which interacts with a child. The social robot 220 may use reaction data collected by the sensors 214 to modify its educational interactions with the child in order to elicit a more desirable or effective educational environment. For example, the social robot 220 may determine that a child responds more favorably to math problems involving horses if the robot detects that the child smiles when providing a response to a horse related question. This preference may be noted in the profile for the child and, based on the modified profile, more horse related questions or scenarios may be added to the current motion script. This determination may be beneficial for prompting positive interaction between the child and the social robot 220 and allowing the child to optimize his or her learning benefits.

Figure 3:
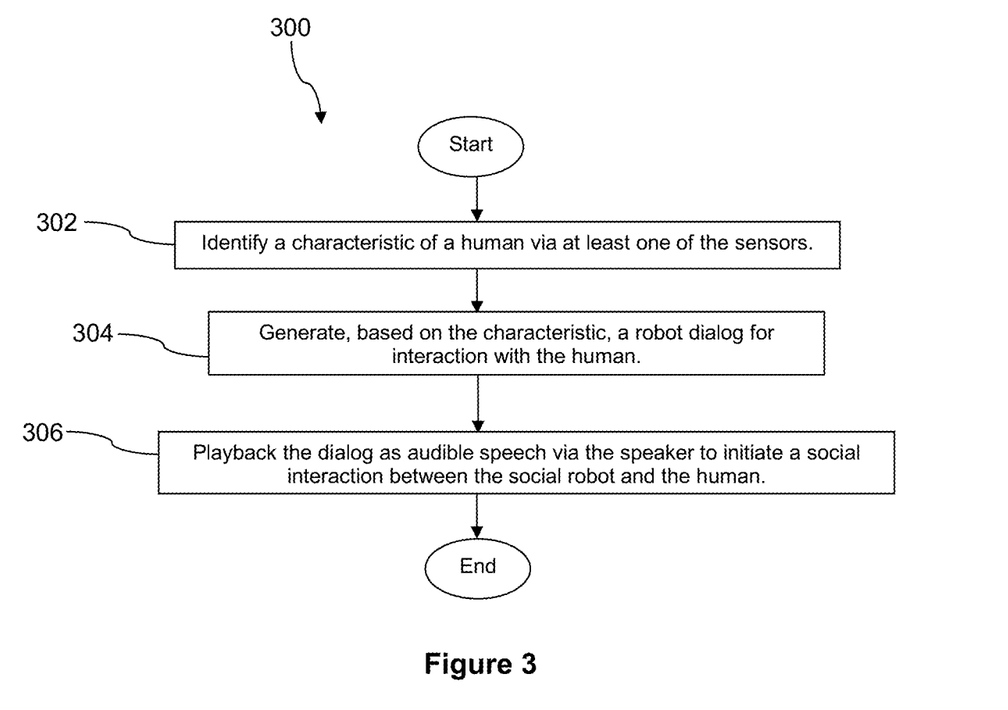
FIG. 3 is a flow chart of a method according to an embodiment of the disclosure.
Figure 4:
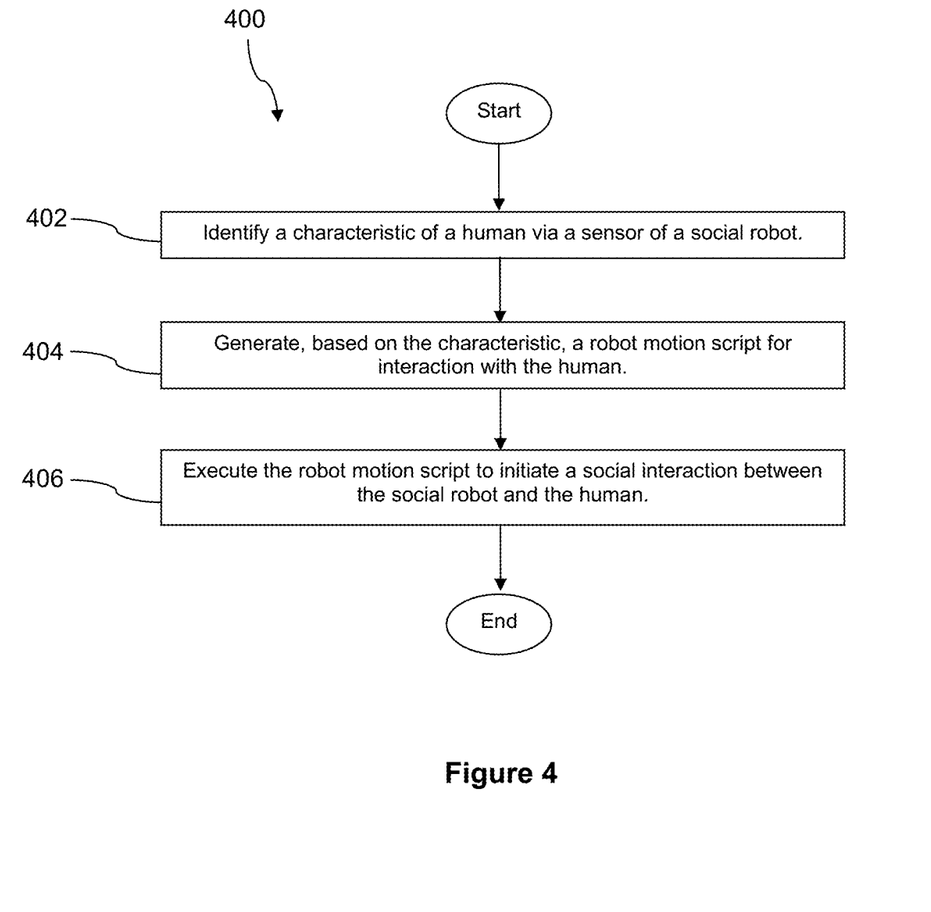
FIG. 4 is a flow chart of another method according to an embodiment of the disclosure.

Turning now to FIG. 3, a method 300 is described. At block 302, identify, by a social robot, a characteristic of a human via at least one of the sensors. At block 304, generate, based on the characteristic, a robot dialog for interaction with the human. At block 306, playback the dialog as audible speech via the speaker to initiate a social interaction between the social robot and the human. Turning now to FIG. 4, a method 400 is described. At block 402, identify, by a social robot, a characteristic of a human via a sensor of the social robot. At block 404, generate, based on the characteristic, a robot motion script for interaction with the human. This can be a motion script based on the identification of human who matches an existing profile in the profile storage of the robot or may be generated as an initial interaction between the robot and a human it has never interacted with before. At block 406, execute the robot motion script to initiate social interaction between the social robot and the human. In an embodiment the dialog created is for a first-time user of the social robot and the dialog begins with an "ice breaker" conversational topic or random gambit or joke generated based on the identified characteristic. For example, if the robot has identified the human as a middle-aged male wearing a base-ball cap, the initial interaction dialog may include a sports-themed joke. The reaction the human gives to this joke will be analyzed by the robot 220 and further used to identify or discard potential future conversational topics as will be discussed in FIG. 5.

Figure 5:
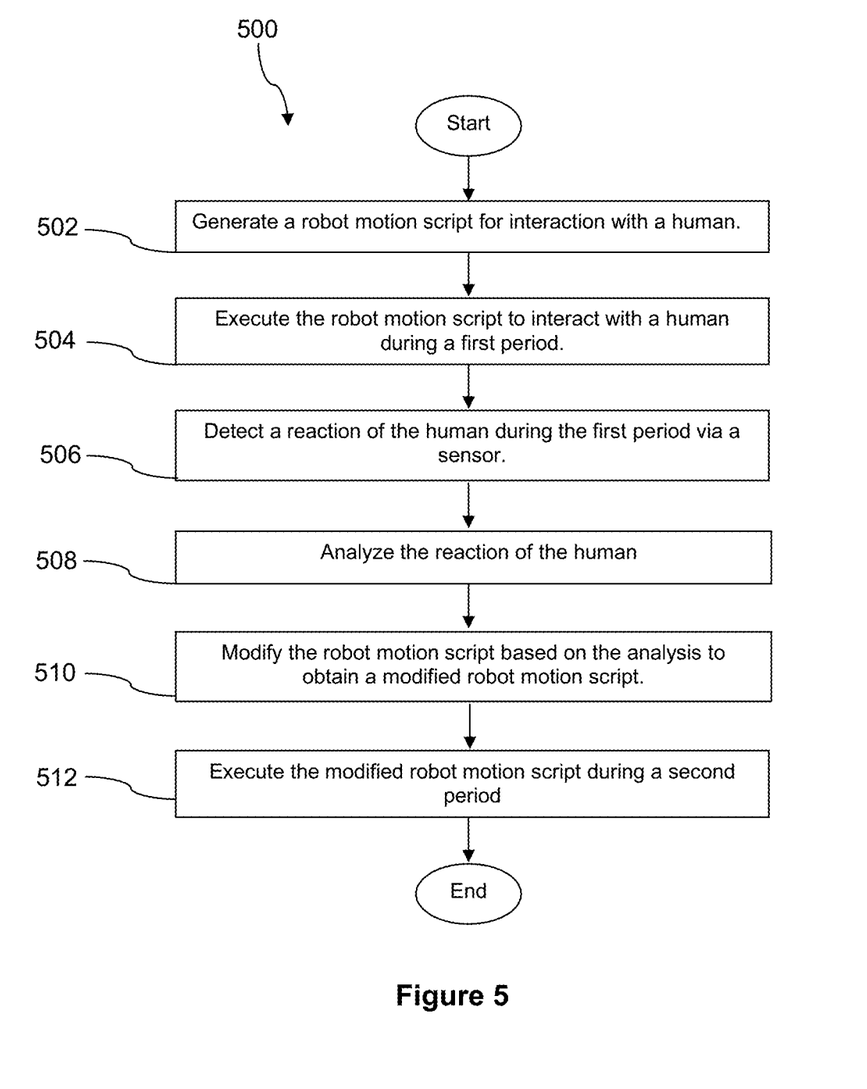
FIG. 5 is a flow chart of still another method according to an embodiment of the disclosure.

Turning now to FIG. 5, a method 500 is described. This method can be used to enhance the method of previous figures and allow for feedback from the human during the interaction. The human's feedback is analyzed and the motion script is altered to reflect the analysis of the feedback to provide a more desirable interaction between the robot and the human. At block 502, generate, by the social robot, a robot motion script for interaction with a human. At block 504, execute the robot motion script to interact with a human during a first period. At block 506, detect a reaction of the human during the first period via a sensor. The reaction can be a visual reaction or an audio reaction. For example, the tone of voice of the human may become sharp or lower into a range identifiable as negative or disinterested. The visual reaction may be prolonged blinking indicating the human is falling asleep or not otherwise stimulated by the conversation or the visual reaction could be the crossing of a person's arms or adjustment of the human's body posture. At block 508, analyze the reaction of the human. At block 510, modify the robot motion script based on the analysis to obtain an improved, modified robot motion script. For example, if a negative reaction was detected, the current line of conversation may be removed and a new topic assigned to the conversation. If a positive reaction is detected, additional conversational scripts of a similar vein can be added to the current motion script. At block 512, execute, by the robot, the modified robot motion script during a second period. In an embodiment, the steps of the method described by FIG. 5 may be repeated until, during the analysis of the reaction in block 508, a positive classification of reaction is determined by the robot. This allows the robot to continue to shift the interaction between the robot and the human until a topic of conversation is acknowledged by the human as being desirable.

In an embodiment, control questions are dispersed through all dialog scripts regardless of feedback-directed content. This technique prevents social robots from getting fixed in conversational loops or focused too heavily on a single preference of a human interaction. It is axiomatic that while a human may show a preference for a single sports team that does not imply that sports is the sole topic of discussion or interest that person may wish to experience in an interaction with a social robot. The robot may not initially be able to perceive a desire to introduce new subject matter if the human enjoys the subject they are talking about such a favored sports team, but with the insertion of a control question about current events the social robot may be able to include an equally interesting and previously undiscussed venture into world politics. The robot may introduce the control question, sense a positive reaction to the new subject, and include conversational topics from the control question's category of conversational topics to enhance and vary the experience of the human interacting with the social robot.

Figure 6:
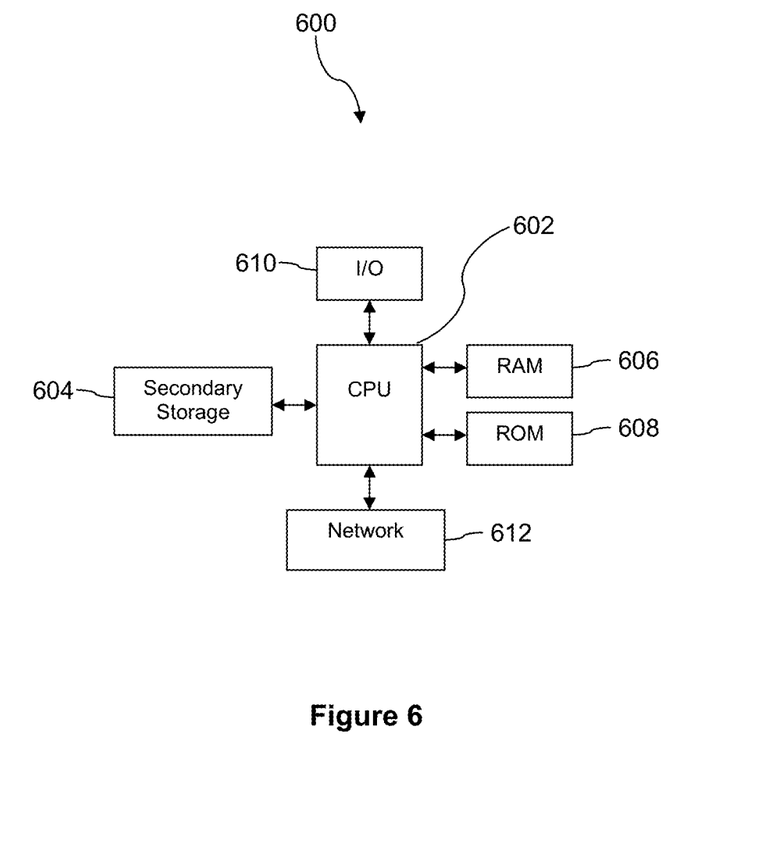
FIG. 6 is a block diagram of a computer system according to an embodiment of the disclosure.

FIG. 6 illustrates a computer system 600 suitable for implementing one or more embodiments disclosed herein. The computer system 600 includes a processor 602 (which may be referred to as a central processor unit or CPU) that is in communication with memory devices including secondary storage 604, read only memory (ROM) 608, random access memory (RAM) 606, input/output (I/O) devices 610, and network connectivity devices 612. The processor 602 may be implemented as one or more CPU chips.

It is understood that by programming and/or loading executable instructions onto the computer system 600, at least one of the CPU 602, the RAM 606, and the ROM 608 are changed, transforming the computer system 600 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 600 is turned on or booted, the CPU 602 may execute a computer program or application. For example, the CPU 602 may execute software or firmware stored in the ROM 608 or stored in the RAM 606. In some cases, on boot and/or when the application is initiated, the CPU 602 may copy the application or portions of the application from the secondary storage 604 to the RAM 606 or to memory space within the CPU 602 itself, and the CPU 602 may then execute instructions that the application is comprised of. In some cases, the CPU 602 may copy the application or portions of the application from memory accessed via the network connectivity devices 612 or via the I/O devices 610 to the RAM 606 or to memory space within the CPU 602, and the CPU 602 may then execute instructions that the application is comprised of. During execution, an application may load instructions into the CPU 602, for example load some of the instructions of the application into a cache of the CPU 602. In some contexts, an application that is executed may be said to configure the CPU 602 to do something, e.g., to configure the CPU 602 to perform the function or functions promoted by the subject application. When the CPU 602 is configured in this way by the application, the CPU 602 becomes a specific purpose computer or a specific purpose machine.

The secondary storage 604 is typically comprised of one or more disk drives or tape drives and is used for non-volatile storage of data and as an over-flow data storage device if RAM 606 is not large enough to hold all working data. Secondary storage 604 may be used to store programs which are loaded into RAM 606 when such programs are selected for execution. The ROM 608 is used to store instructions and perhaps data which are read during program execution. ROM 608 is a non-volatile memory device which typically has a small memory capacity relative to the larger memory capacity of secondary storage 604. The RAM 606 is used to store volatile data and perhaps to store instructions. Access to both ROM 608 and RAM 606 is typically faster than to secondary storage 604. The secondary storage 604, the RAM 606, and/or the ROM 608 may be referred to in some contexts as computer readable storage media and/or non-transitory computer readable media.

I/O devices 610 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 612 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), world-wide interoperability for microwave access (WiMAX), near field communications (NFC), radio frequency identity (RFID), and/or other air interface protocol radio transceiver cards, and other well-known network devices. These network connectivity devices 612 may enable the processor 602 to communicate with the Internet or one or more intranets. With such a network connection, it is contemplated that the processor 602 might receive information from the network, or might output information to the network in the course of performing the above-described method steps. Such information, which is often represented as a sequence of instructions to be executed using processor 602, may be received from and outputted to the network, for example, in the form of a computer data signal embodied in a carrier wave.

Such information, which may include data or instructions to be executed using processor 602 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 602 executes instructions, codes, computer programs, scripts which it accesses from hard disk, floppy disk, optical disk (these various disk based systems may all be considered secondary storage 604), flash drive, ROM 608, RAM 606, or the network connectivity devices 612. While only one processor 602 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 604, for example, hard drives, floppy disks, optical disks, and/or other device, the ROM 608, and/or the RAM 606 may be referred to in some contexts as non-transitory instructions and/or non-transitory information.

In an embodiment, the computer system 600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 600 to provide the functionality of a number of servers that is not directly bound to the number of computers in the computer system 600. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 600, at least portions of the contents of the computer program product to the secondary storage 604, to the ROM 608, to the RAM 606, and/or to other non-volatile memory and volatile memory of the computer system 600. The processor 602 may process the executable instructions and/or data structures in part by directly accessing the computer program product, for example by reading from a CD-ROM disk inserted into a disk drive peripheral of the computer system 600. Alternatively, the processor 602 may process the executable instructions and/or data structures by remotely accessing the computer program product, for example by downloading the executable instructions and/or data structures from a remote server through the network connectivity devices 612. The computer program product may comprise instructions that promote the loading and/or copying of data, data structures, files, and/or executable instructions to the secondary storage 604, to the ROM 608, to the RAM 606, and/or to other non-volatile memory and volatile memory of the computer system 600.

In some contexts, the secondary storage 604, the ROM 608, and the RAM 606 may be referred to as a non-transitory computer readable medium or a computer readable storage media. A dynamic RAM embodiment of the RAM 606, likewise, may be referred to as a non-transitory computer readable medium in that while the dynamic RAM receives electrical power and is operated in accordance with its design, for example during a period of time during which the computer system 600 is turned on and operational, the dynamic RAM stores information that is written to it. Similarly, the processor 602 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A social robot comprising:
   a speaker;
   a plurality of sensors, the plurality of sensors comprising at least one audio sensor and at least one visual sensor;
   a processor; and
   a non-transitory computer readable storage medium storing programming for execution by the processor, the programming including instructions to:
      receive input via at least one of the plurality of sensors;
      identify a plurality of characteristics of a human based on the input received via the at least one of the plurality of sensors, the plurality of characteristics of the human comprising a diction level, a voice cadence, a gender, and an age range;
      generate, based on the plurality of characteristics, a robot dialog that includes a first control question for interaction with the human, wherein the first control question invokes at least one of a physical reaction or vocal reaction from the human to confirm that the plurality of characteristics are associated with one of a plurality of profiles stored in the storage medium;
      playback, via the speaker, the robot dialog as audible speech to initiate a social interaction between the social robot and the human;
      in response to playback of the first control question of the robot dialog, detect, via one or more of the plurality of sensors, a reaction of the human, the reaction being at least one of a physical reaction and a vocal reaction;
      confirm that a profile corresponding to the human matches the plurality of characteristics based on the detected reaction;
      based on the profile, initiate a motion script that activates actuators of the social robot;
      irrespective of the detected reaction of the human, insert additional control questions into the robot dialog, wherein the additional control questions are dispersed throughout the robot dialog and invoke one or more of a physical reaction and a vocal reaction from the human; and
      continue playback of the robot dialog that includes the additional control questions.

2. The social robot of claim 1, wherein the plurality of characteristics of the human identified further comprises a race and a non-anthropometric identifier chosen by the human.

3. The social robot of claim 1, wherein the plurality of characteristics is identified based on at least one of an audio data acquired by the at least one of the plurality of sensors and a visual data acquired by the at least one of the plurality of sensors.

4. A method for adapting robot motion to improve social interaction between a social robot and a human comprising:
   receiving, by a social robot executing a processor, input via a plurality of sensors of the social robot;
   identifying, by the social robot, a plurality of characteristics of the human based on the input received via the plurality of sensors of the social robot, the plurality of characteristics of the human comprising a diction level, a voice cadence, a gender, and an age range;
   based on identifying the plurality of characteristics, generating, by the social robot, a robot dialog that includes a first control question for interaction with the human, wherein the first control question invokes at least one of a physical reaction or vocal reaction from the human to confirm that the plurality of characteristics are associated with one of a plurality of profiles stored in a non-transitory storage medium communicatively coupled to the social robot;

generating, by the social robot executing a motion script application, a robot motion script for interaction with the human;

executing, by the social robot, the robot motion script that activates actuators of the social robot to initiate a social interaction between the social robot and the human;

playing, via a speaker of the social robot, the robot dialog as audible speech while the robot motion script is executing;

in response to playing the first control question of the robot dialog, detecting, via the plurality of sensors, a reaction of the human, the reaction being at least one of a physical reaction and a vocal reaction;

confirming, by the social robot, that a profile corresponding to the human matches the plurality of characteristics based on the detected reaction;

irrespective of the detected reaction of the human, inserting, by the social robot, additional control questions into the robot dialog, wherein the additional control questions are dispersed throughout the robot dialog and invoke one or more of a physical reaction and a vocal reaction from the human; and continuing, by the social robot, playback of the robot dialog that includes the additional control questions.

5. The method of claim 4, wherein the plurality of characteristics is identified based on at least one of an audio data acquired by one of the plurality of the sensors and a visual data acquired by one of the plurality of the sensors.

6. The method of claim 4, wherein executing the motion script occurs over a first time period.

7. The method of claim 4, further comprising: adapting, by the social robot, the robot motion script and the robot dialog in response to reactions from the human following playback of the additional questions.

8. The method of claim 4, wherein a characteristic of the plurality of characteristics corresponds with a race of the human.

9. The method of claim 4, wherein the plurality of characteristics is identified by a cadence range of voice based on a pre-defined mapping stored in a memory of the social robot mapped to at least one of an age range, race, and gender.

10. The method of claim 4, wherein the plurality of characteristics is identified by a visually acquired data based on a pre-defined mapping stored in a memory of the social robot mapped to at least one of an age profile, a race profile, and a gender profile.

11. The method of claim 4, wherein the robot motion script comprises at least one or more of audio and movement commands.

12. The method of claim 4, wherein identifying the plurality of characteristics comprises:

collecting, by the plurality of sensors, audio or visual data corresponding to the human, and determining, by the social robot, that the audio or visual data is associated with at least one user profile stored in a memory of the social robot.

13. A method for adapting robot motion to improve social interaction between a robot and a human comprising:

identifying, by a social robot, a plurality of characteristics of a human via at least one sensor of the social robot, the plurality of characteristics of the human comprising a diction level, a voice cadence, a gender, and an age range;

based on identifying the plurality of characteristics, generating, by the social robot, a robot dialog that includes a first control question for interaction with the human, wherein the first control question invokes at least one of a physical reaction or vocal reaction from the human to confirm that the plurality of characteristics are associated with one of a plurality of profiles stored in a non-transitory storage medium communicatively coupled to the social robot;

generating, by the social robot, a robot motion script for interaction with the human;

executing, by the social robot, the robot motion script to interact with the human during a first period;

playing, via a speaker of the social robot, the robot dialog as audible speech while the robot motion script is executing;

in response to playing at least the control question of the robot dialog, detecting, by the social robot, a reaction of the human during the first period via a sensor of the social robot;

in response to detecting, analyzing, by the social robot, the reaction of the human;

confirming, by the social robot, that a profile corresponding to the human matches the plurality of characteristics based on analyzing the reaction;

based on the profile, modifying, by the social robot, the robot motion script to obtain a modified robot motion script;

irrespective of the detected reaction of the human, inserting, by the social robot, additional control questions into the robot dialog, wherein the additional control questions are dispersed throughout the robot dialog and invoke one or more of a physical reaction and a vocal reaction from the human;

executing, by the social robot, the modified robot motion script during a second period to obtain an improved interaction with the human; and continuing, by the social robot, playback of the robot dialog that includes at least some of the additional control questions during the second period.

14. The method of claim 13, wherein the reaction comprises at least one of a vocal reaction or a physical reaction, the vocal reaction comprising at least one voice generated sound by the human and the physical reaction comprising at least one body movement made by the human.

15. The method of claim 14, wherein analyzing the reaction by the social robot comprises determining a positive or negative classification of the reaction based on playback of the first control question.

16. The method of claim 15, wherein the determining the positive or negative classification comprises:

detecting, by the social robot, at least one of a voice generated sound or a body movement of the human during the first period; and determining, by the social robot, that the voice generated sound or the body movement is associated with one of the positive or negative classification based on a pre-defined mapping stored in a memory of the social robot, wherein the pre-defined mapping maps known body movement or voice-generated sound queues to positive or negative reactions.

17. The method of claim 13, wherein modifying the robot motion script comprises incorporating a pre-defined modification stored in a memory of the social robot, and wherein the pre-defined modification is based on the determination of a negative reaction.

18. The method of claim 13, wherein the robot motion script comprises at least one or more of audio and movement commands of the social robot.

19. The method of claim 13, wherein the modified robot motion script comprises at least one or more of audio and movement commands of the social robot.

20. The method of claim 13, wherein the steps of detecting the reaction, analyzing the reaction of the human, modifying the robot motion script based on the analysis, and executing, by the social robot, the modified robot motion script during a second period are repeated until a positive reaction from the human is determined to occur by the social robot.

* * * * *